(12) United States Patent
Jeon et al.

(10) Patent No.: US 8,719,472 B2
(45) Date of Patent: May 6, 2014

(54) METHOD FOR CONTROLLING THE OUTPUT OF DEVICES IN THE NETWORK

(71) Applicant: LG Electronics Inc., Seoul (KR)

(72) Inventors: Beom Jin Jeon, Seoul (KR); Hyeon Cheol Cho, Seoul (KR); Taek Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/671,473

(22) Filed: Nov. 7, 2012

(65) Prior Publication Data

US 2013/0067007 A1   Mar. 14, 2013

Related U.S. Application Data

(63) Continuation of application No. 12/374,529, filed as application No. PCT/KR2007/005149 on Oct. 19, 2007, now Pat. No. 8,373,688.

(30) Foreign Application Priority Data

Oct. 20, 2006   (KR) .................... 10-2006-0102231

(51) Int. Cl.
   *G06F 3/14*   (2006.01)
(52) U.S. Cl.
   USPC ................................ 710/64; 710/5
(58) Field of Classification Search
   None
   See application file for complete search history.

(56) References Cited

U.S. PATENT DOCUMENTS

| | | | |
|---|---|---|---|
| 5,940,387 A | 8/1999 | Humpleman | |
| 5,986,622 A | 11/1999 | Ong | |
| 6,256,045 B1 * | 7/2001 | Bae et al. | 348/445 |
| 6,771,278 B2 | 8/2004 | Shigeta | |
| 6,839,071 B1 | 1/2005 | Miyamoto | |
| 6,873,345 B2 * | 3/2005 | Fukuda et al. | 715/807 |
| 7,023,493 B2 | 4/2006 | Morikawa | |
| 7,292,588 B2 | 11/2007 | Milley et al. | |
| 7,690,017 B2 | 3/2010 | Stecyk et al. | |

(Continued)

FOREIGN PATENT DOCUMENTS

| | | |
|---|---|---|
| JP | 2000286880 | 10/2000 |
| JP | 2002-175068 | 6/2002 |

(Continued)

OTHER PUBLICATIONS

A.Vaios et.al., "Analysis of a Topology Control Paradigm in WLAN/WPAN Environments", 157-84, Athens, Greece, Feb. 21, 2006, Computer Communications 29; XP25089932A.

(Continued)

*Primary Examiner* — Cheng-Yuan Tseng
(74) *Attorney, Agent, or Firm* — Lee, Hong, Degerman, Kang & Waimey

(57) ABSTRACT

A wireless network system includes a platform device transmitting a first message including display capability information to at least one device and at least one device transmitting a second message to the platform device in response to the first message. The display capability information includes information on a display space and a display format supportable by the platform device. The second message includes display output information of the at least one device. The display output information includes: information on a display space, a display format, and display contents selected by the at least one device based upon the display capability information; and field type information that indicates characteristics of a field in which the display contents are displayed.

10 Claims, 10 Drawing Sheets

(56) References Cited

U.S. PATENT DOCUMENTS

| | | |
|---|---|---|
| 2001/0010525 A1 | 8/2001 | Fukuda et al. |
| 2001/0026386 A1 | 10/2001 | Yamamoto et al. |
| 2001/0038422 A1 | 11/2001 | Yamada et al. |
| 2002/0089518 A1 | 7/2002 | Shigeta |
| 2002/0113907 A1 | 8/2002 | Endo et al. |
| 2003/0026193 A1 | 2/2003 | Shiomi et al. |
| 2003/0066080 A1 | 4/2003 | Kamieniecki |
| 2003/0097452 A1 | 5/2003 | Kim et al. |
| 2003/0097485 A1 | 5/2003 | Horvitz et al. |
| 2003/0234811 A1 | 12/2003 | Kim |
| 2004/0014526 A1 | 1/2004 | Kulas |
| 2004/0017394 A1 | 1/2004 | Adachi |
| 2004/0049797 A1 | 3/2004 | Salmonsen |
| 2005/0068346 A1 | 3/2005 | Ogawa et al. |
| 2005/0091571 A1 | 4/2005 | Leichtling |
| 2005/0102699 A1 | 5/2005 | Kim et al. |
| 2005/0166241 A1 | 7/2005 | Kim et al. |
| 2005/0191034 A1 | 9/2005 | Sakon |
| 2005/0196155 A1 | 9/2005 | Yoo et al. |
| 2005/0212965 A1 | 9/2005 | Stone et al. |
| 2005/0235071 A1 | 10/2005 | Zarenin |
| 2006/0080382 A1 | 4/2006 | Dutta et al. |
| 2006/0158385 A1 | 7/2006 | Etelapera |
| 2007/0105588 A1 | 5/2007 | Issa |
| 2007/0192486 A1 | 8/2007 | Wilson et al. |
| 2008/0066120 A1 | 3/2008 | Igoe |
| 2008/0066124 A1 | 3/2008 | Igoe et al. |
| 2010/0257238 A1 | 10/2010 | Jeon et al. |
| 2010/0319037 A1 | 12/2010 | Kim et al. |

FOREIGN PATENT DOCUMENTS

| | | |
|---|---|---|
| JP | 2005109703 | 4/2005 |
| KR | 10-2000-0053586 | 8/2000 |
| WO | 9429840 | 12/1994 |
| WO | 2004031978 | 4/2004 |
| WO | 2005109122 | 11/2005 |
| WO | 2006043977 | 4/2006 |
| WO | 2007046888 | 4/2007 |

OTHER PUBLICATIONS

"E-EDID Implementation Guide", Jun. 4, 2001, VESA, version 1.0, pp. 1-18.

"Transparent Data Structure Changes", IBM Technical Disclosure Bulletin, Jun. 1973, vol. 16, issue 1, pp. 72-77.

"AV/C Digital Interface Command Set General Specification" 1394 Trade Association, 1998, version 3.0, pp. 1-94.

\* cited by examiner

METHOD FOR CONTROLLING THE OUTPUT OF DEVICES IN THE NETWORK

CROSS-REFERENCE TO RELATED APPLICATIONS

This application is a continuation of U.S. patent application Ser. No. 12/374,529, filed on Jan. 21, 2009, now U.S. Pat. No. 8,373,688, which is the National Stage filing under 35 U.S.C. 371 of International Application No. PCT/KR2007/005149, filed on Oct. 19, 2007, which claims the benefit of earlier filing date and right of priority to Korean Application No. 10-2006-0102231, filed on Oct. 20, 2006, the contents of which are all hereby incorporated by reference herein in their entirety.

TECHNICAL FIELD

The present invention relates to a network, and more particularly to a method for controlling an output of a device in a network.

BACKGROUND ART

Recently, Bluetooth wireless personal area network (WPAN) technology of transmitting/receiving audio or video data between devices in a wireless network established among a relatively small number of digital devices in a restricted space such as home or an office has been developed. The WPAN may be used to exchange information among the relatively small number of digital devices within a relatively small area and may enable low-power and low-cost communication among the digital devices.

If communication is performed through a wireless technology, it is possible to eliminate a line such as a cable for connecting the devices. In addition, it is possible to directly exchange data information between the devices through the wireless network communication between the devices. The devices which can perform the communication in the network may include all digital devices such as a computer, a personal digital assistant (PDA), a notebook computer, a digital television receiver, a camcorder, a digital camera, a printer, a microphone, a speaker, a headset, a barcode reader, a display, a mobile telephone and so on.

If the devices configuring the network are respectively controlled, the use of the plurality of devices via the network is not efficient. If control devices corresponding to the devices are separately provided, a resource is wasted and an inconvenience is given to a user. Accordingly, there is a need for a method for efficiently controlling the devices configuring the wireless network.

DISCLOSURE OF THE INVENTION

Technical Problem

In a conventional method for controlling the devices configuring the network, all existing devices are configured in one-to-one correspondence with the functions of the devices. That is, if a specific device included in the network receives a control input transmitted by a user, the specific device transmits a predetermined control signal to another device according to the control input such that another device is controlled. Since, the control signal transmitted by the specific device is previously set or promised between the specific device and another device, the configuration is significantly complicated and compatibility is hard to be guaranteed. In addition, the control signal which can be used to control another device is restricted. Further, in spite of the complicated configuration, if a new device appears or a new function is added, a complicated process of adding information about the new device or function is required. In addition, it may be impossible to cope with the new device or function.

Technical Solution

Accordingly, the present invention is directed to a method for controlling an output of a device in a network that substantially obviates one or more problems due to limitations and disadvantages of the related art.

An object of the present invention devised to solve the problem lies on a method for efficiently controlling devices so as to perform wireless communication in a network.

Another object of the present invention devised to solve the problem lies on a device controlling method capable of easily coping with appearance of a new device.

According to the present invention, it is possible to control a display device (e.g., a TV receiver) and the other devices configuring a network through a simple control protocol. A device which receives information notified from the other devices to a user and displays the information on a display is called a platform device or a sink device. The platform device receives basic device capability information and control information of the other devices, outputs the information on a predetermined portion of the display, and sends a signal transmitted by a user device to the other devices. That is, the platform device functions as an interface between the user and the other devices so as to allow the user to directly control the other devices. A simple control signal may be directly transmitted to the other devices. According to the present invention, it is possible to provide a method for allocating predetermined display spaces to the other devices and allowing the other devices to freely display desired information in the respective allocated display spaces to easily control the devices.

In an aspect of the present invention, there is provided a method for controlling an output of a platform device in a network including at least one device, the method including: transmitting a message including display capability information to the at least one device, receiving a message including display output information from the at least one device wherein the display output information is formatted by the at least one device to satisfy the display capability information, and displaying the received display output information on a display of the platform device.

In another aspect of the present invention, there is provided a method of controlling an output of a first device in a platform device, the method including: transmitting display capability information to the first device, receiving display output information from the first device wherein the display output information is formatted by the first device to satisfy the display capability information, and displaying the received display output information on a display of the platform device.

Advantageous Effects

According to the present invention, it is possible to facilitate the connection between devices via wireless communication. In addition, it is possible to control various devices by a simple efficient method at the time of network communication. Further, it is possible to cope with the appearance of a new device with a simple method and to easily control the new device.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Mode for Invention

Reference will now be made in detail to the preferred embodiments of the present invention, examples of which are illustrated in the accompanying drawings. Wherever possible, the same reference numbers will be used throughout the drawings to refer to the same or like parts.

Additional advantages, objects, and features of the invention will be more readily apparent from consideration of the following detailed description relating to the accompanying drawings. Hereinafter, embodiments of the present invention will be described with reference to the accompanying drawings. The embodiments described below are examples of applying the technical features of the present invention to a wireless video area network (WVAN) which is one of wireless networks. The WVAN is a wireless network using a wireless HD (WiHD) technology capable of providing throughput of 4.5 Gbps or more such that an uncompressed 1080p A/V stream can be transmitted using a frequency band of 60 GHz in a local area of 10 m or less.

Figure 1:
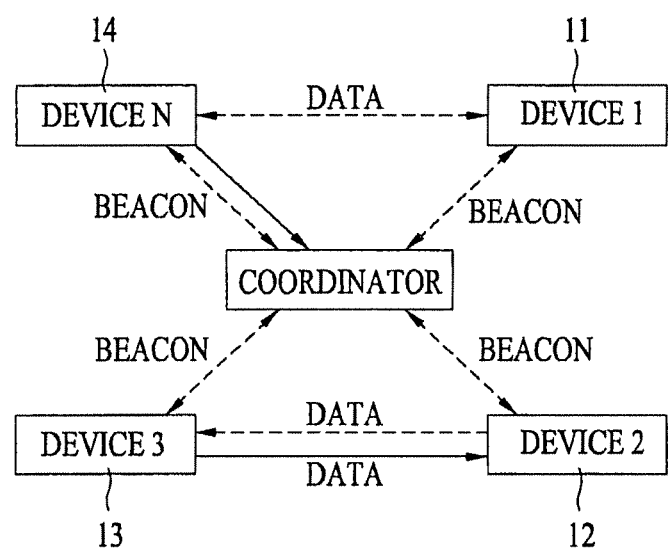
FIG. 1 is an example of a wireless video area network (WVAN) including a plurality of devices.

FIG. 1 is an example of a WVAN including a plurality of devices.

The WVAN is a network configured to exchange data between the devices located in a predetermined space. The WVAN includes at least two devices 10 to 14 and any one of the devices is operated as a coordinator 10. The coordinator 10 is a device which performs a function for allocating and scheduling predetermined wireless resources in order to allow the plurality of devices to share the wireless resources without collision when the wireless network between the devices is configured. The coordinator may transmit/receive data via at least one channel as a general device, in addition to the function for allocating the resources so as to allow the devices configuring the network to perform communication. The coordinator may perform functions such as clock synchronization, network association and bandwidth resource maintenance.

The WVAN supports two physical layers PHY. That is, the WVAN supports a high-rate physical layer (HRP) and a low-rate physical layer (LRP) as the physical layer. The HRP can support a data transmission rate of 1 Gb/s or more and the LRP can support a data transmission rate of several Mb/s. The HRP is used to transmit an isochronous data stream, asynchronous data, a media access control (MAC) command, and A/V control data via a unicast connection in a highly directional mode. The LRP supports a directional or an omni-directional mode and is used to transmit a beacon, asynchronous data and an MAC command including a beacon via unicast or broadcasting. A HRP channel and an LRP channel share a frequency band and are divided and used by a time division multiplexing (TDM) scheme. The HRP uses four channels of a bandwidth of 2.0 GHz and the LRP uses three channels of a bandwidth of 92 MHz, in a band of 57 to 66 GHz.

Figure 2:
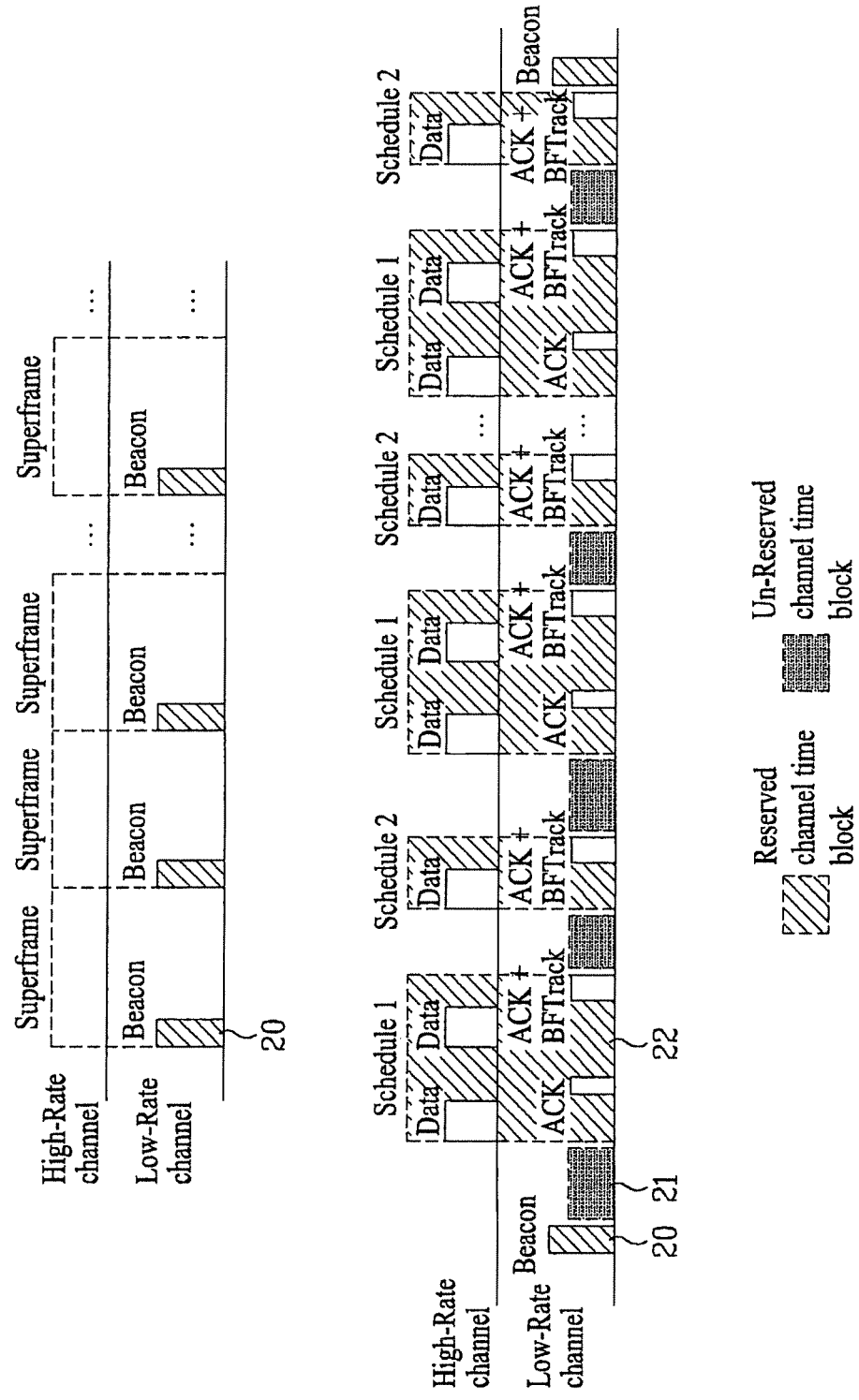
FIG. 2 is a view illustrating an example of a superframe structure used in the WVAN.

FIG. 2 is a view illustrating an example of a superframe structure used in the WVAN.

Referring to FIG. 2, each superframe includes an area 20 for transmitting a beacon, a reserved channel time block 22, and an unreserved channel time block 21. The channel time blocks are time-divided into an area (HRP) for transmitting data via the HRP and an area (LRP) for transmitting data via the LRP. The beacon 20 is periodically transmitted by the coordinator in order to identify an introduction of each superframe. The beacon includes scheduled timing information and WVAN management/control information. The devices may exchange data via the timing information and the management/control information included in the beacon in the network. The HRP area may be used to allow a device, which is allocated with a channel time by the coordinator according to a request for the allocation of the channel time, to transmit data to another device. Although not shown in FIG. 2, a contention-based control period (CBCP) which is located next to the beacon is included in order to transmit an urgent control/management message. The length of the CBCP is set not to exceed a predetermined threshold value mMAXCBCPLen.

Figure 3:
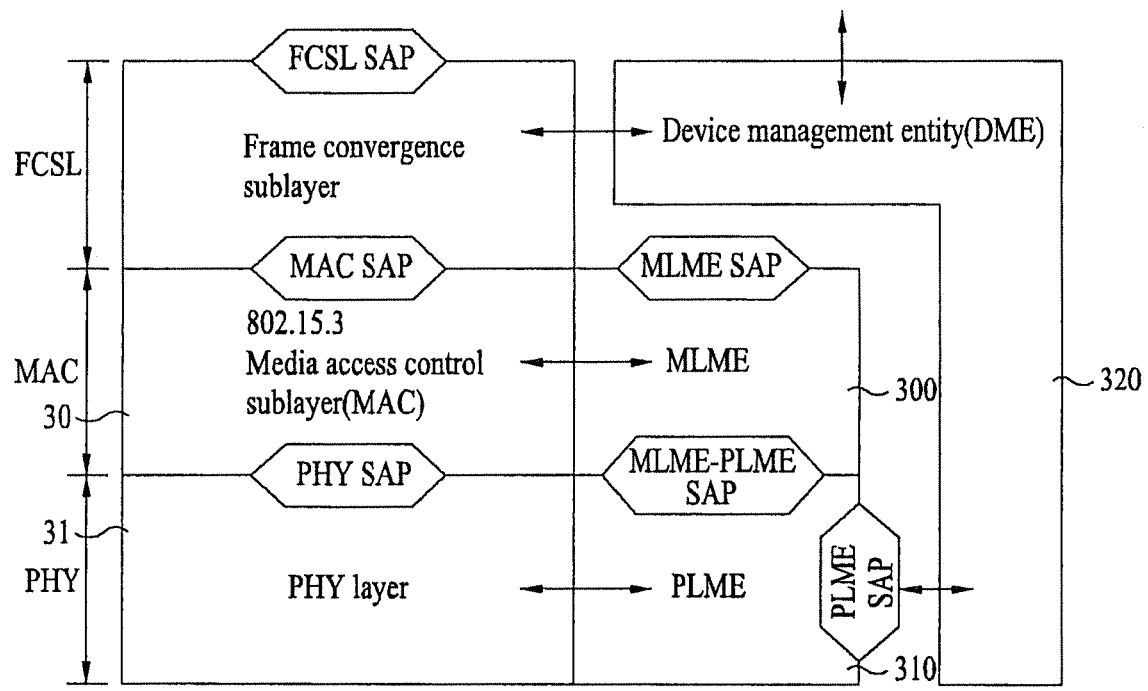
FIG. 3 is a view showing a protocol layer structure implemented by the devices in the WVAN.

FIG. 3 is a view showing a protocol layer structure implemented by the devices in the WVAN.

Referring to FIG. 3, a communication module of each device included in the WVAN includes at least two layers according to the function: a PHY layer 31 and an MAC layer 30. The communication module of the device includes an entity for managing each layer. An entity for managing the MAC layer is called an MAC layer management entity (MLME) 300 and an entity for managing the PHY layer is called a PHY layer management entity (PLME) 310. The communication module includes a device management entity (DME) 320 for collecting status information of each device and performing a control interface between a host and a wireless device. A message which is exchanged between different layers is called primitive.

Figure 4:
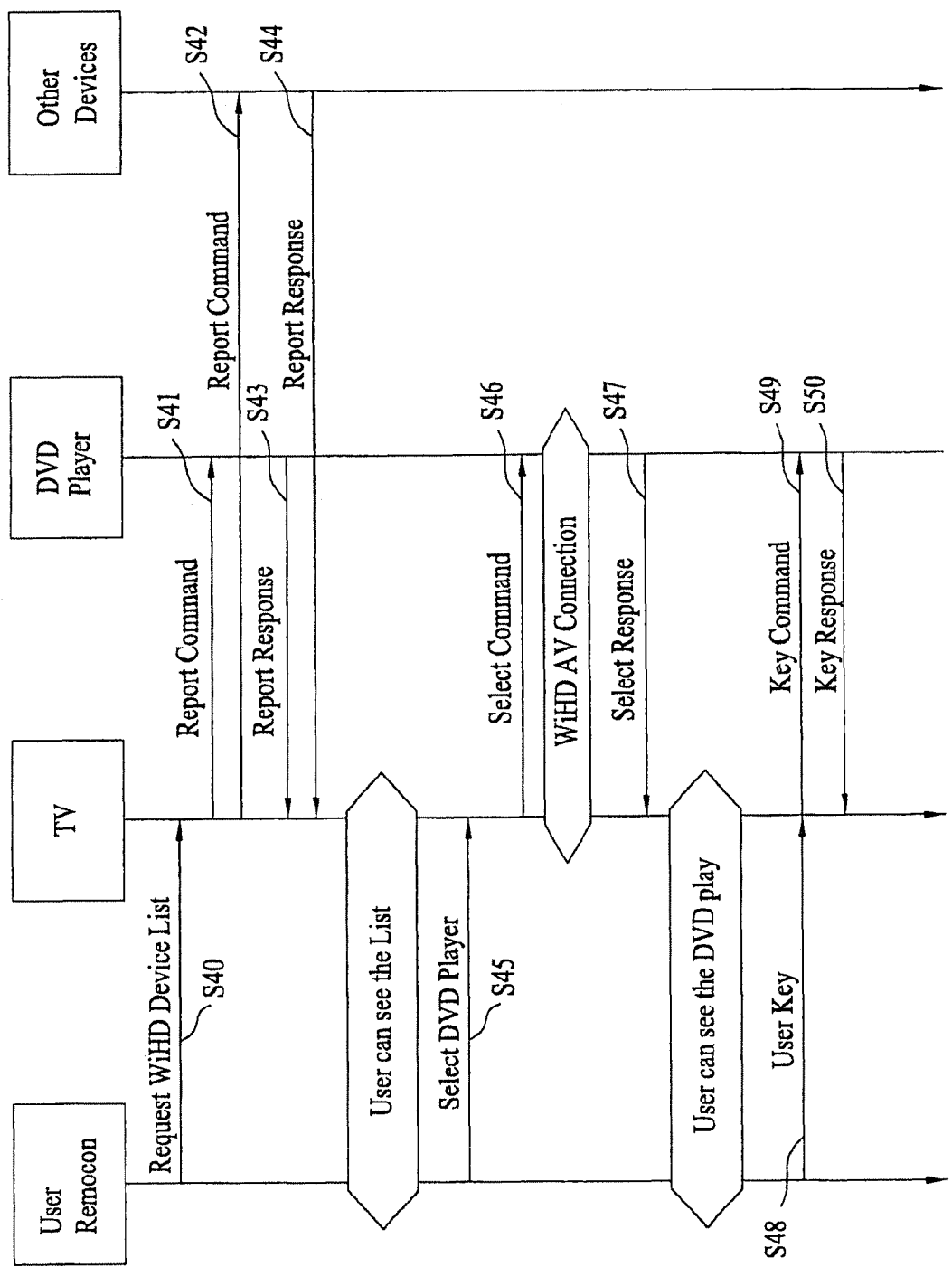
FIG. 4 is a flowchart illustrating a method according to an embodiment of the present invention.
Figure 5:
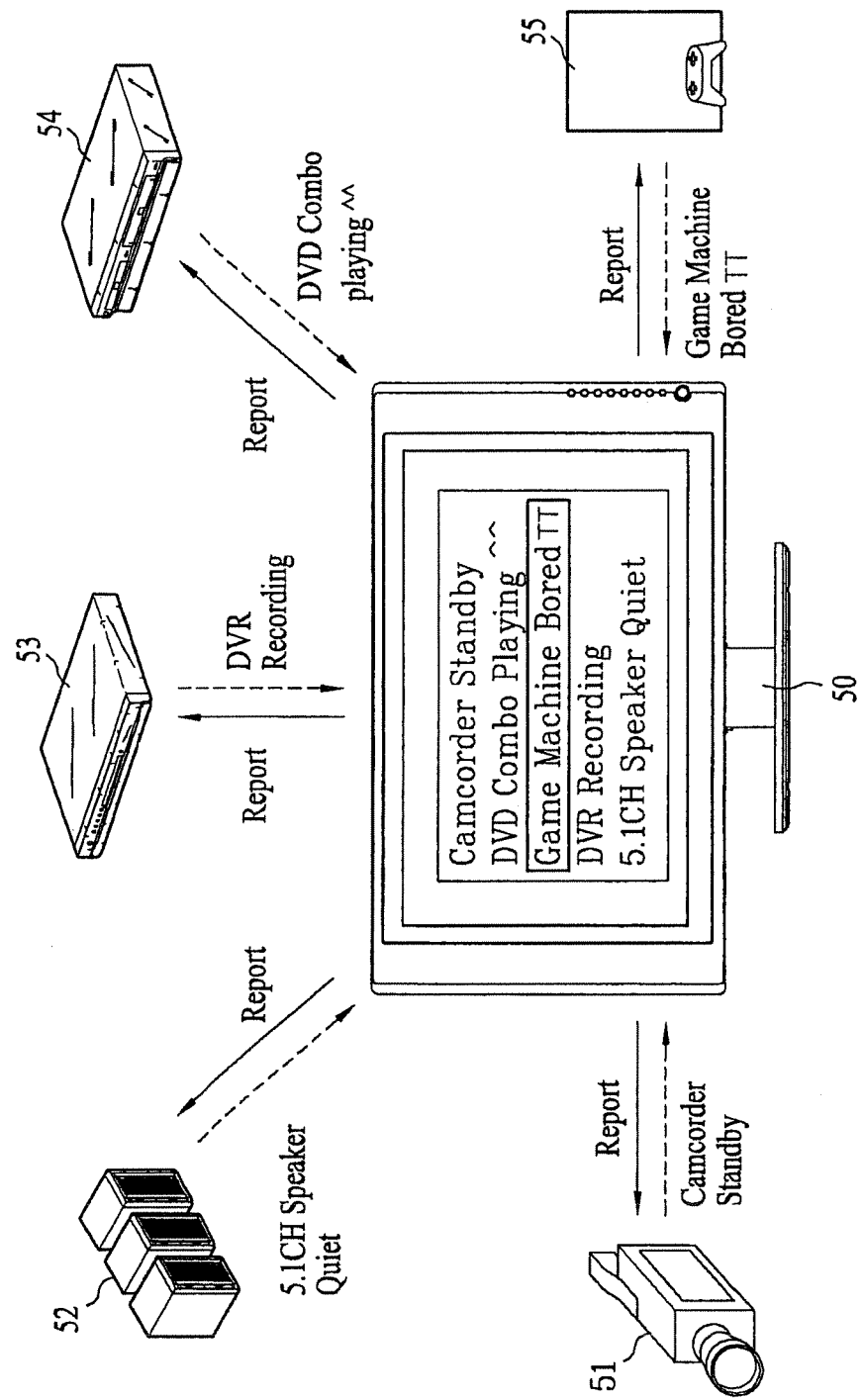
FIG. 5 is a view illustrating the embodiment of the present invention.

FIG. 4 is a flowchart illustrating a method according to an embodiment of the present invention. FIG. 5 is a view illustrating a process of transmitting/receiving a report request message in the method according to the embodiment of the present invention shown in FIG. 4.

Referring to FIGS. 4 and 5, a television (TV) receiver 50, a camcorder 51, a 5.1-channel speaker 52, a digital video recorder (DVR) 53, a digital versatile disc (DVD) 54 and a game machine 55 configure the WVAN to perform communication. Among these devices, since the TV receiver 50 has a widest display space, it is preferable that the television receiver 50 is set to a platform device. The TV receiver (hereinafter, referred to as the "platform device") 50 receives a signal for requesting a list of devices connected to the network from a user device (S40). The platform device 50 transmits a message including a report request message including information about predetermined display spaces to the connected devices 51 to 55 according to the signal (S41 and S42).

The report request message is a message for requesting predetermined information such as basic device capability information of a destination device to the devices which receive the request message by informing display capability information including allocated display space information.

Table 1 shows an example of an MAC command frame format for the report request message.

TABLE 1

| Address Source: Destination | Command code | Capability code |
|---|---|---|

The frame format shown in Table 1 includes an address field, a command code field and a capability code field. The addresses of a source device and a destination device can be confirmed through the address field and the command code field includes a code for the transmitted command. The command may be for the report request message shown in FIG. 5, a select request message for notifying that a specific device is selected, trying to input/output connection with a specific device, and requesting control information of the specific device (for example, a key value of each function of the specific device), and a key request message for selecting the control information of the specific device and requesting the execution of an operation or a function.

In the capability code field, display capability information provided to the destination device is included. The display capability information includes display space information which can be outputted via the platform device and display format information which can be supported by the platform device.

The display space information may include information about the size or the position of the display space, which can be used by the destination device, in a full display space of the platform device. For example, the information about the display space may be information about the area of the display space which can be used by the destination device, a ratio of the display space, which can be used by the destination device, to the full display space, the number of characters in a predetermined character size, and the position of the display space in the full display. The size of the display space which can be used by the destination device may be determined by a defined length of a single field and a number of fields allocated to the destination device. For example, if the single field is defined to be represented on a line in the display space of the platform device, the device, which receives a message for instructing the use of two fields, transmits information which can be represented on two lines.

The information about the output format may include a supportable language (e.g., Korean, English, Japanese or the like), supportable color depth information, supportable character size information, supportable character type information and so on.

If the platform device 50 transmits the report request message configured in the frame format shown in Table 1, the code for the report request message is included in the command code field shown in Table 1.

The device which receives the request message 20 through the report request message transmits the basic device capability information of the device as a response. Since the report request message includes the display capability information such as the display space information and the display format information which can be supported by the platform device, the destination device may confirm a display space which can be allowed by the platform device. The destination device can freely represent its own basic device capability information within the allocated display space and the supportable display format.

The device which receives the message transmits a response message including the basic device capability information or the control information of the destination device to the platform device. The destination device can freely transmit information, which will be displayed on the display in a text, video or audio format, that is, display output information, which is formatted by the destination device to satisfy the display capability information transmitted by the platform device.

The display output information includes information about contents which will be outputted by the destination device and information about an output format which will be used for the output contents. Table 2 shows an example of an MAC response frame format for the response message including the display output information if the text format is used.

TABLE 2

| Address Source: Destination | LCI | String#1 | LCI | String#2 | ... | LCI | String#n | EOF | LCI | String#1 | LCI | String#2 | ... | LCI | String#n | EOF |
|---|---|---|---|---|---|---|---|---|---|---|---|---|---|---|---|---|

The frame format shown in Table 2 includes an address field, a LCI (language color index) field, a string#n field and an EOF (end of field) field.

The address field includes information about the address of the device, and the LCI field includes information about an output format which will be used with respect to a text, that is, information about a used language and a used color determined by the display capability information received from the platform device. If the information about another output format is transmitted via the request message shown in Table 1, the information about the output format may include the information about another format. The String#n field includes information about contents which will be outputted through the platform device (in this case, a text format). Through the EOF field, it is confirmed that a single field is completed.

For example, if the single field is defined to be displayed on a line, the text transmitted after receiving the EOF field is outputted on a new line on the display. Each device which transmits the message through the response frame format can output information represented by various methods on the display of the platform device because at least one text can be included in the single field such that representation is possible and the text can have different languages, different colors, different character sizes and different character styles.

In Table 2, a variety of information can be transmitted as an example of the message format transmitted for requesting the output to the platform device. For example, a field index may be transmitted such that a field number in which the text is displayed on the platform device, that is, the positional information of the display space, is notified. In addition, a language index may be transmitted such that language information of the text is notified.

In addition, a field type may be transmitted such that information about the characteristics of the field in which the text is displayed is notified. For example, information about the field characteristics, such as a plain text, an information request for requesting a specific information input, a key-pass-through or key bypass for passing an input signal of a user from the platform device to another device, and a menu refresh for allowing the platform device to re-transmit the display characteristics, that is, the display capability information, to the device, may be notified.

A parameter type may be transmitted such that the type of the parameter requested by the device is notified. The parameter type may include a digit, a character and a string. Information about the number of parameters may be transmitted such that the total number of parameters included in the message is notified.

In the above-described method, if a specific device (here, the platform device) satisfies a predetermined condition included in the display capability information, desired information may be notified by the specific device using various representation methods. Accordingly, in a device in which the display space is insufficient, interfacing with the user may be more freely achieved.

The devices 51 to 55 which receive the report, request message freely represent the information using the response message frame format shown in Table 2 and transmit the information through the response messages (S43 and S44). At this time, the devices 51 to 55 will respectively configure the response messages using the respective basic information within the range satisfying an output format condition with reference to the display capability information included in the report request.

Referring to FIG. 5, the camcorder 51 transmits a text "Camcorder Standby", the 5.1-channel speaker 52 transmits a text "5.1CH Speaker Quiet", the DVR 53 transmits a text "DVR Recording", the DVD 54 transmits a text "DVD Combo playing^^", and the game machine 55 transmits a text "Game Machine Bored TT" as information outputted by the platform device 50. The response messages represented in a free fashion may be transmitted using the response frame format described using Table 2.

The platform device 50 which receives the response message displays the respective basic information of the devices included in the received response message on the display space of the device. If the respective basic device capability information of the devices cannot be displayed on the display, several pages of screens or a scroll function are/is used. The report request message and the information about the devices 51 to 55 which can be controlled through the responses thereof can be confirmed. The user may confirm the information about the devices displayed by the platform device, and selects and controls any one of the devices (S45).

A time (hereinafter, referred to as a "response time") consumed for transmitting/receiving the messages when the devices are controlled by the above-described method will now be described. Equation 1 shows an example of a method for checking the response time.

$$[N_d*(L_c+L_r)]/[2.5 \text{ Mbps}*0.01] \quad \text{Equation 1}$$

In Equation 1, $N_d$ denotes the number of devices connected to the platform device, $L_c$ denotes the length of the request frame, and $L_r$ denotes the length of the response frame. Here, "2.5 Mbps" indicates the data transmission rate which can be supported by the LRP and "0.01" denotes the LRP duty when the message is transmitted through the LRP. For example, if the value of $N_d$ is 10, the value of $L_c$ is 4 Bytes, and the value of $L_r$ is 60 Bytes, a time consumed for reading ten pieces of device information is only 200 msec, that is, 0.2 sec. By using a simple protocol, it is possible to reduce the length of the transmitted/received message and shorten the response time.

Figure 6:
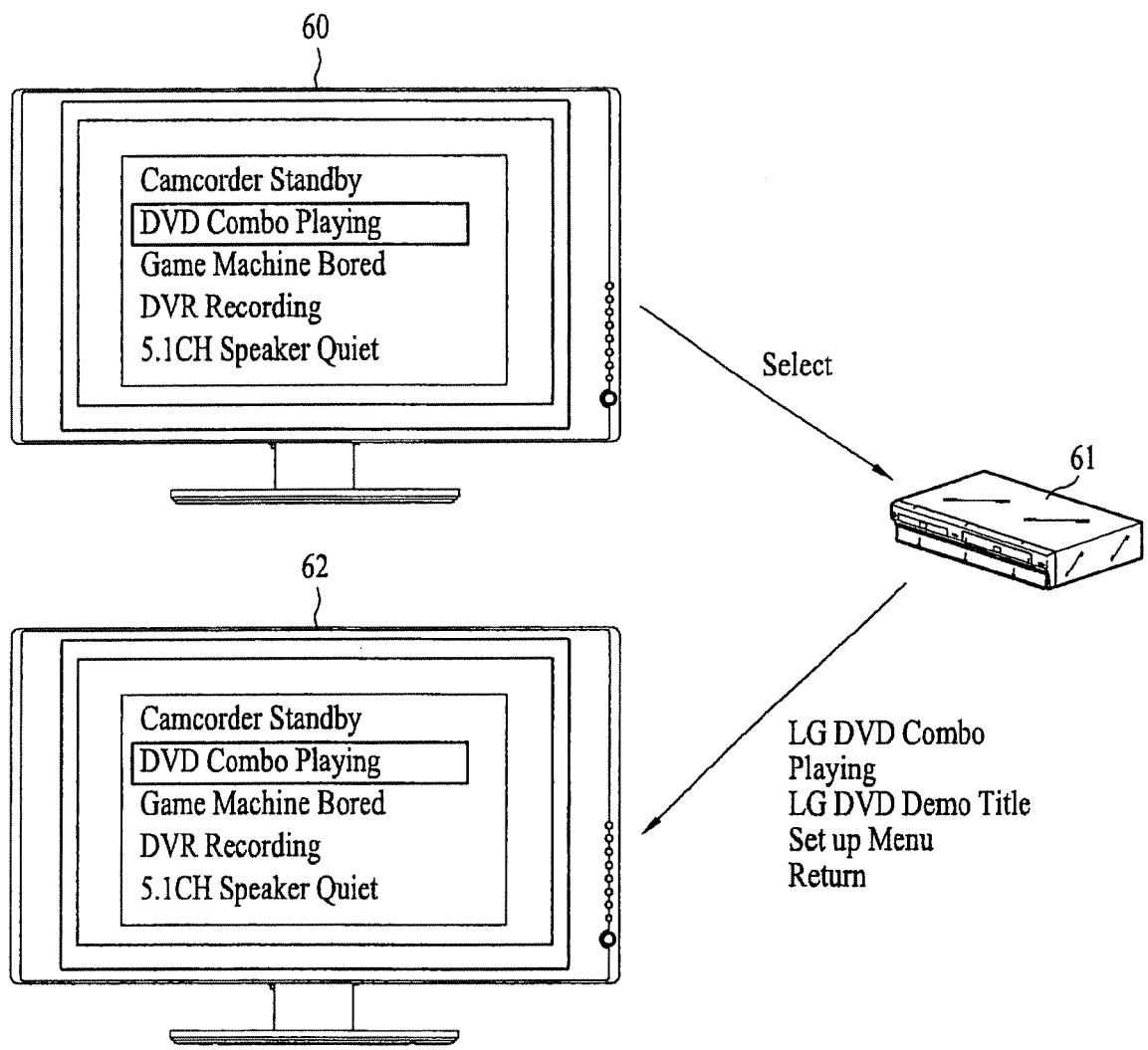
FIG. 6 is a view illustrating the embodiment of the present invention.

FIG. 6 is a view illustrating a process of transmitting/receiving a select request message in the embodiment of the present invention shown in FIG. 4. Referring to FIG. 6, if one of the devices is selected, the platform device 60 receives a signal for selecting a specific device through the user device and transmits the select request message to the specific device according to the signal (S46). The select request message, is a message for notifying that the device which receives the message is selected and performing the subsequent control process.

When the select request message is transmitted and/or received, the user may directly control the selected device through the platform device. The device which receives the select request message transmits the response message including information about the key value of the device (S47). The key value is an interfacing value which is defined by each device with the function or the operation of each device. For example, if the device is the DVD and the key value is "Play", the DVD which receives the key value "Play" plays the DVD and outputs a moving image. The platform device displays information about the received key value of the device on the display. In the example shown in FIG. 6, the DVD 61 is selected. The platform device transmits the select request message to the DVD 61, and the DVD 61 transmits the response message including the information about the key value of the DVD 61 according to the request message. The platform device 62 which receives the response message displays the received key value on the display.

The formats described using Tables 1 and 2 may be used as the frame formats of the select request message and the response message corresponding to the select request message. After a specific device is selected, the display area (e.g., the length of the field or the number of fields) allocated to the specific device is further increased compared with the report request message described using FIG. 5. As a result, detailed information, that is, a greater amount of information, is outputted and is viewed by the user. That is, the code for the select request message is transmitted through the command code field of Table 1, and a greater number of fields or a longer field is included in the capability code field such that information for allocating a wider output display space is transmitted. The device which receives the request message can transmit the response message corresponding to the request message using the response frame format shown in Table 2.

A key input signal for selecting at least one of the key values is received from the user device. When the key input signal is received, the signal is sent to the selected device. A method for transferring the signal received from the user device to another device is called a key pass-through method or a key passing-through method. If the key pass-through method is used, the key input of the user may directly be sent to another device. The user device has a function for transmitting signals for the platform device and another device (external device) to be distinguished from each other. This function may be implemented through a specific button. The signal transmitted from the user device is transmitted to be identified as the signal for another external device, through the specific button. When the platform device receives the signal for the external device, the signal passes through to the external device.

Figure 7:
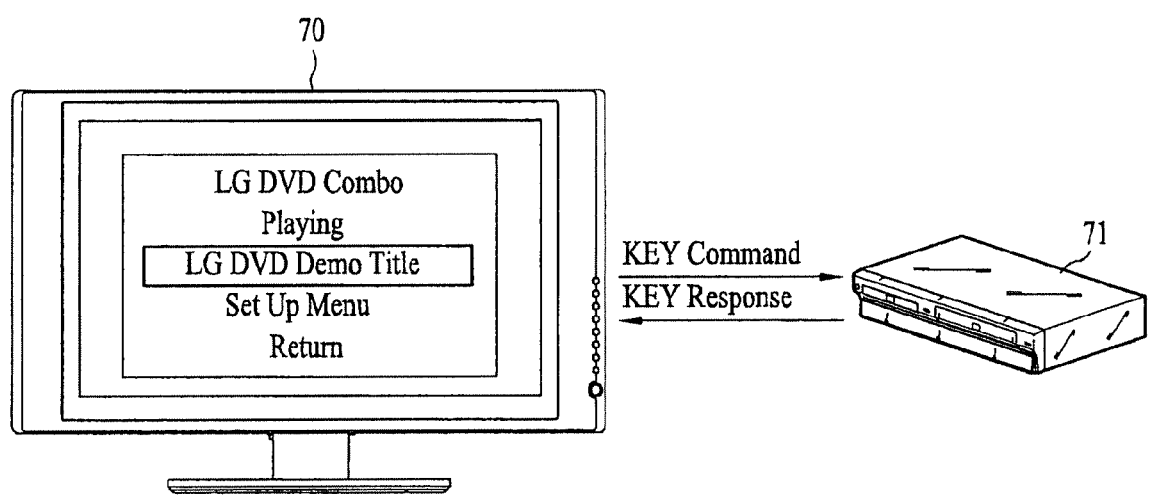
FIG. 7 is a view illustrating the embodiment of the present invention.

FIG. 7 is a view illustrating a process of transmitting/receiving a key request message in the method according to the embodiment of the present invention shown in FIG. 4. Referring to FIG. 7, the platform device 70 transmits the key request message to the selected device 71 in order to pass the signal for selecting a specific key value (S48) received from the user device (S49). The key request message is a message for notifying the selected key value. Even in this case, the frame format described using Table 1 may be used in order to transmit, the key request message. The command code for the selected key value is transmitted through the command code field of the frame format. The device 71 which receives the message including the key request message transmits the response message corresponding to the request message (S50). At this time, the frame format for transmitting the response message may use the frame format described using Table 2. In the frame format for transmitting the response message for the key request message, the command code field may be further included in the frame format shown in Table 2 such that the information about the received key value is transmitted through the command code.

After the select request message is transmitted and received, the input/output of the platform device and the input/output of the selected device are connected to each other. That is, if the selected device is a source device, the output of the selected device is outputted to the platform device so as to be displayed on the display. If the selected device is a sink device, the display of the platform device is sent to the selected device. For example, if the selected device is the DVD, an image outputted by the DVD is outputted on the display of the platform device such that the user can view the DVD image.

Figure 8:
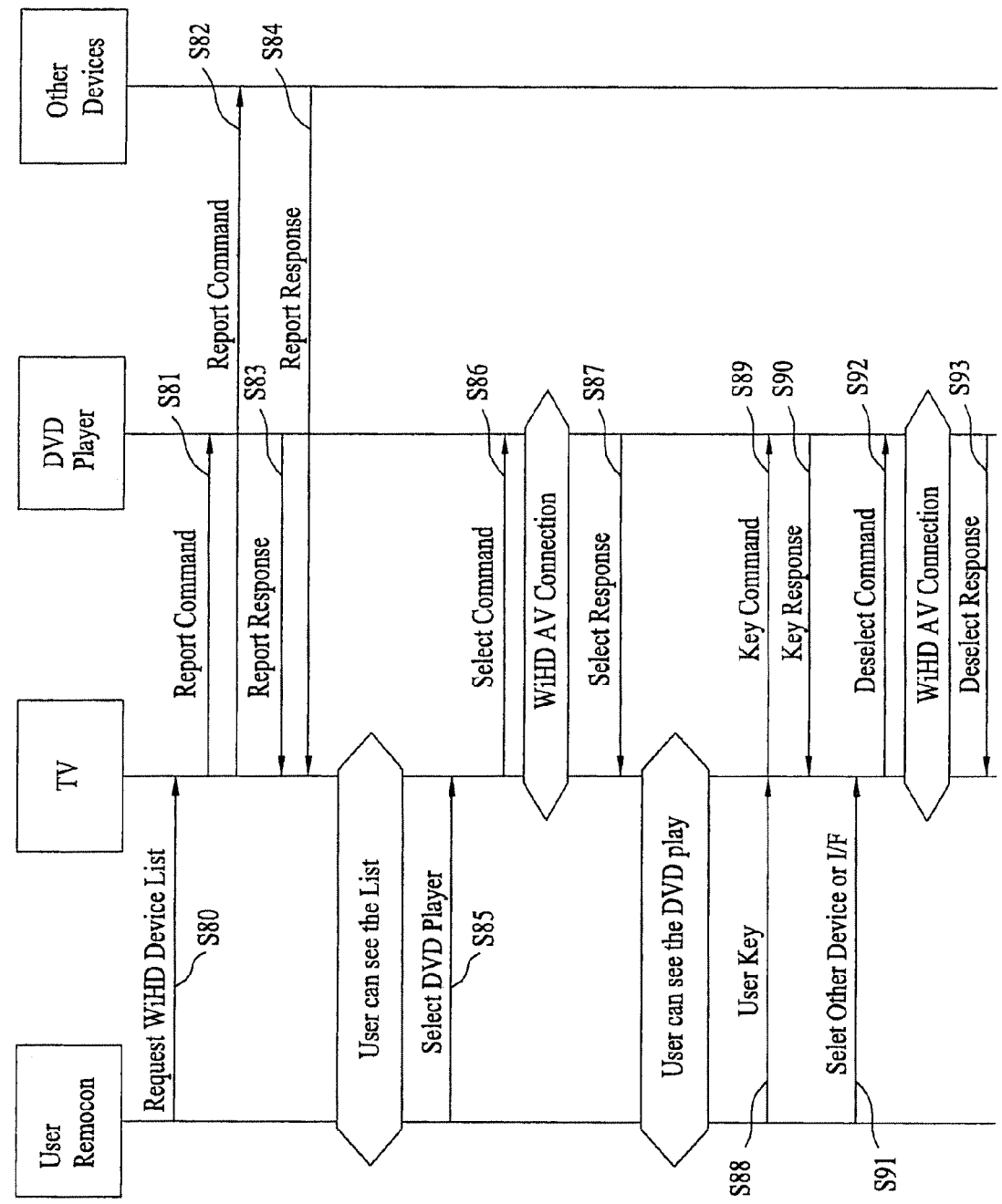
FIG. 8 is a flowchart illustrating a method according to another embodiment of the present invention.

FIG. 8 is a flowchart illustrating a method according to another embodiment of the present invention. When the user wants to use another device other than the device which is currently being used or controlled or wants to use another interface, the connection with the device which is currently being used is no longer maintained. Accordingly, the connection between the specific device and the platform device is established through the method described using FIG. 4 (S80 to S90). The platform device receives a signal for selecting another device or another interface from the user device (S91). The platform device which receives the signal transmits a deselect request message to the device (the DVD, in this case) which is currently being connected so as to transmit and/or receive the audio or video signal or the control signal (S92). The deselect request message is a message for disconnecting the device which is currently being selected and connected. When the deselect request message is transmitted to the device, the video or audio connection is released. Even when the deselect request message is transmitted, the frame format described using Table 1 may be used and the code for the deselect request message is transmitted through the command code field of the frame format. When the deselect request message is transmitted and received and the contents of the request message is executed, the connection between the platform device and the device is released. The device which receives the message transmits the response message for the request message to the platform device (S93). The message for notifying that the connection is released through the response message may be outputted on the display of the platform device. The response message may be transmitted using the response frame format described using Table 2.

Figure 9:
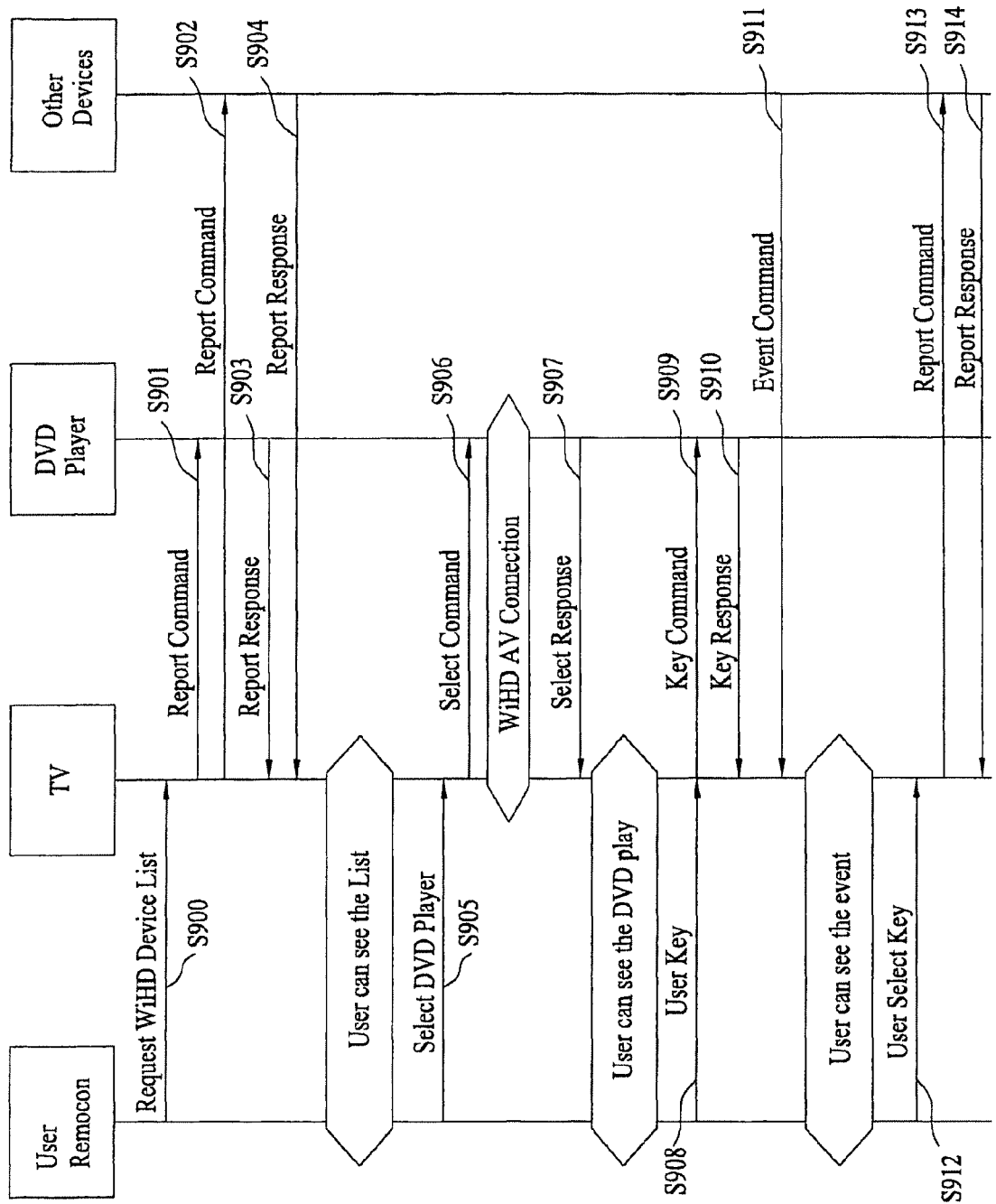
FIG. 9 is a flowchart illustrating a method according to another embodiment of the present invention.

FIG. 9 is a flowchart illustrating a method according to another embodiment of the present invention. When the specific device is selected and connected through the method described using FIG. 4 such that the audio or video signal or the control signal is transmitted and/or received to/from the specific device, the specific device or another device included in the WVAN may output specific information on the display of the platform device. In this case, the specific device or another device transmits an event request message to the platform device (S911). The event request message is a message which is used when the device notifies the user of the predetermined information. For example, the event request message may be used when another device connected to the TV receiver, that is, the camcorder or the like, notifies that a battery is exhausted or a memory is insufficient, while a moving image of the DVD is being outputted through the TV receiver.

Another device transmits the event request message to the platform device (S911). Table 3 shows an example of an event request message frame format included in the message.

TABLE 3

| Address Source: Destination | Command code |
|---|---|

The event request frame format shown in Table 3 includes an address field and a command code field. The address field includes, address information of a source device and a destination device, and the command code field includes code information for the request message. In this case, the code for the event request message is transmitted through the command code field.

When the event request message is transmitted to the platform device, a message representing that an event occurs is displayed on the display of the platform device. The user device transmits a signal for checking the contents of the event via the display (S912). The platform device which receives the signal may transmit the report request message described using FIG. 5 to the device which transmits the event request message (S913). The device which receives the report request message may transmit information for notifying the contents of the event in the form of a text or an image as a response for the report request message (S914). If the text is used, the response frame format described using Table 2 may be used. The device for notifying the event may notify the user of the event in various representation methods (language, color, style or the like) through the response frame format.

Figure 10:
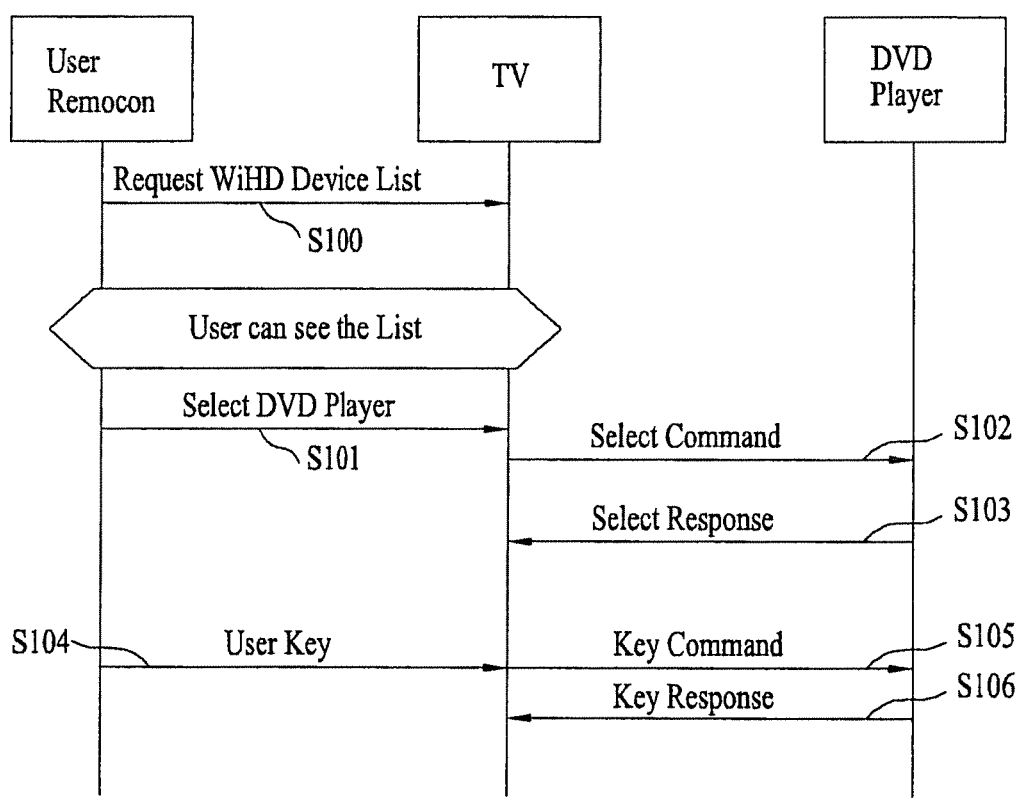
FIG. 10 is a flowchart illustrating a method according to another embodiment of the present invention.

FIG. 10 is a flowchart illustrating a method according to another embodiment of the present invention. Even when the video or audio inputs/outputs of the platform device and the specific device are connected to each other, another device may be controlled by the platform device while maintaining the connection. In this case, a portion of the display is used to display information of the used devices according to the signal received from the user device. Another device (DVD) is selected through the information displayed on the portion of the display (S101). A key value for controlling the function of the selected device is received and the selected device is controlled through transmission/reception of a key request message and a key response (S102 to S106). Compared with the case shown in FIG. 4, the report request message does not need to be transmitted/received in order to display the information of the connected devices and the inputs/outputs of the device and the platform device are not connected after the device for control is selected.

The terms used above may be replaced with other terms. For example, the device may be changed to the user device (or apparatus) or a station, and the coordinator may be changed to a coordinating (controlling) apparatus, a coordinating (controlling) device, a coordinating (or controlling) station, or a piconet coordinator (PNC).

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

The invention claimed is:

1. A wireless network system comprising:
a platform device configured to transmit a first message including display capability information to at least one device, the display capability information comprising information on a display space and a display format supportable by the platform device; and
at least one device configured to transmit a second message to the platform device in response to the first message, the second message including display output information of the at least one device, the display output information comprising information on a display space, a display format, and display contents selected by the at least one device based upon the display capability information,
wherein:
the display output information further includes field type information that indicates characteristics of a field in which the display contents are displayed; and
the characteristics of the field comprise "plain text" indicating that the display contents are a plain text, "information request" indicating that the display contents are for the at least one device to request the platform device to send a specific information input from a user, "key bypass" indicating that the display contents are for the at least one device to request the platform device to pass a user input to the at least one device, and "menu refresh" indicating that the display contents are for the at least one device to request the platform device to send the display capability information to the at least one device.

2. The wireless network system of claim 1, wherein the platform device is further configured to display the display contents on a display of the platform device based on the display output information.

3. The wireless network system of claim 2, wherein the platform device is further configured to:
receive the user input when the field type information indicates the key bypass; and
transmit the user input to the at least one device.

4. The wireless network system of claim 1, wherein the information on the display space included in the first message comprises a length of a field and a number of fields to be allocated to the at least one device.

5. The wireless network system of claim 4, wherein the information on the display format included in the first message comprises a supportable language.

6. The wireless network system of claim 5, wherein the display contents are represented by a text format and the information included in the display output information that is associated with the display format includes a language index indicating a language for the text format.

7. The wireless network system of claim 1, wherein the display output information further includes at least a field index, a field type, a parameter type, or a number of parameters.

8. The wireless network system of claim 7, wherein the parameter type is at least a digit, a character, or a string.

9. A platform device for performing output control in a wireless network, the platform device configured to:
transmit a first message including display capability information to at least one device included in the wireless network, the display capability information comprising information on a display space and a display format supportable by the platform device;
receive a second message including display output information from the at least one device, the display output information comprising information on a display space, a display format, and display contents selected by the at least one device based upon the display capability information,
wherein the display output information further includes field type information that indicates characteristics of a field in which the display contents are displayed, wherein the characteristics of the field comprise "plain text" indicating that the display contents are a plain text, "information request" indicating that the display contents are for the at least one device to request the platform device to send a specific information input from a user, "key bypass" indicating that the display contents are for the at least one device to request the platform device to pass a user input to the at least one device, and "menu refresh" indicating that the display contents are for the at least one device to request the platform device to send the display capability information to the at least one device; and
display the display contents on a display of the platform device based on the display output information.

10. A method for controlling an output of a platform device in a wireless network including at least one device, the method comprising:
transmitting a first message including display capability information to at least one device included in the wireless network, the display capability information comprising information on a display space and a display format supportable by the platform device;
receiving a second message including display output information from the at least one device, the display output information comprising information on a display space, a display format, and display contents selected by the at least one device based upon the display capability information, wherein the display output information further includes field type information that indicates characteristics of a field in which the display contents are displayed, wherein the characteristics of the field comprise "plain text" indicating that the display contents are a plain text, "information request" indicating that the display contents are for the at least one device to request the platform device to send a specific information input from a user, "key bypass" indicating that the display contents are for the at least one device to request the platform device to pass a user input to the at least one device, and "menu refresh" indicating that the display contents are for the at least one device to request for the platform device to send the display capability information to the at least one device; and
displaying the display contents on a display of the platform device based on the display output information.

* * * * *